(12) United States Patent
Henkel et al.

(10) Patent No.: US 7,938,690 B2
(45) Date of Patent: May 10, 2011

(54) MOUNTING PLATE WITH FIXING MEANS FOR AN ELECTRICAL DEVICE

(75) Inventors: Hartmut Henkel, Blomberg (DE); Helmut Eusterholz, Paderborn (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 104 days.

(21) Appl. No.: 12/445,006

(22) PCT Filed: Oct. 10, 2007

(86) PCT No.: PCT/EP2007/008803
§ 371 (c)(1),
(2), (4) Date: Apr. 9, 2009

(87) PCT Pub. No.: WO2008/046545
PCT Pub. Date: Apr. 24, 2008

(65) Prior Publication Data
US 2009/0286422 A1   Nov. 19, 2009

(30) Foreign Application Priority Data
Oct. 13, 2006  (DE) .......................... 10 2006 049 019

(51) Int. Cl.
*H01R 9/26* (2006.01)
(52) U.S. Cl. ....................................................... 439/716
(58) Field of Classification Search .................. 439/716, 439/532
See application file for complete search history.

(56) References Cited

U.S. PATENT DOCUMENTS
3,277,427 A * 10/1966 Jurca .............................. 439/716
(Continued)

FOREIGN PATENT DOCUMENTS
DE       2250248 A1    4/1974
(Continued)

OTHER PUBLICATIONS
International Search Report for PCT/EP2007/008803 mailed on Jan. 31, 2008.

*Primary Examiner* — Gary F. Paumen
(74) *Attorney, Agent, or Firm* — Leydig, Voit & Mayer, Ltd.

(57) ABSTRACT

A mounting plate includes a first fixing device for an electrical device and a second fixing device for a top-hat shaped mounting rail having a first offset support flange and a second offset support flange. The second fixing device includes a first holder and a second holder each having a contact portion and each being disposed mirror-symmetrically about a longitudinal axis of the mounting plate on a rear surface of the mounting plate. The second fixing device further includes an abutment opposite the first and second holders, and a metal projection configured to clamp at least one of the first and second offset support flanges against the contact portions of the first and second holders. The projection is configured to deform upon clamping of the at least one of the offset support flanges.

16 Claims, 3 Drawing Sheets

U.S. PATENT DOCUMENTS

| | | | | |
|---|---|---|---|---|
| 5,022,873 | A | * | 6/1991 | Kollmann ............... 439/716 |
| 5,334,054 | A | * | 8/1994 | Conrad et al. ............ 439/716 |
| 5,816,867 | A | * | 10/1998 | Davidsz et al. ........... 439/828 |
| 5,853,304 | A | * | 12/1998 | Landreau et al. .......... 439/721 |
| 6,488,527 | B2 | * | 12/2002 | Yoon ..................... 439/441 |
| 6,543,957 | B1 | | 4/2003 | Raspotnig |
| 6,962,507 | B2 | * | 11/2005 | Suess .................... 439/532 |
| 7,192,316 | B1 | * | 3/2007 | Pollmann ................. 439/716 |
| 2005/0175402 | A1 | | 8/2005 | Schurr et al. |

FOREIGN PATENT DOCUMENTS

| | | |
|---|---|---|
| DE | 7426836 U | 11/1974 |
| DE | 9406386 U1 | 6/1994 |
| DE | 19646696 C1 | 4/1998 |
| DE | 19838432 C1 | 5/2000 |
| EP | 1189320 A2 | 3/2002 |
| EP | 1615307 A1 | 1/2006 |
| FR | 2718895 A1 | 10/1995 |
| GB | 2381132 A | 4/2003 |

* cited by examiner

MOUNTING PLATE WITH FIXING MEANS FOR AN ELECTRICAL DEVICE

CROSS REFERENCE TO PRIOR APPLICATIONS

This application is a U.S. National Phase application under 35 U.S.C. §371 of International Application No. PCT/EP2007/008803, filed Oct. 10, 2007, and claims benefit to German Patent Application No. DE 10 2006 049 019.3, filed Oct. 13, 2006. The International Application was published in German on Apr. 24, 2008 as WO 2008/046545 under PCT Article 21(2).

FIELD

The present invention relates to a mounting plate with fixing means for an electrical device and a mounting rail.

BACKGROUND

A mounting plate of this type is described, for example, in DE 196 46 696 C1.

Such mounting plates take the form of an elongated flat member having a front side for attachment of electrical devices thereto and a rear side allowing for attachment to mounting rails, in particular in control cabinets.

The mounting plate is provided at a first longitudinal end on the rear side with fixing means for receiving a mounting rail which is top-hat shaped in cross section and has offset support flanges, said fixing means including hook-shaped holders having a contact portion and engaging over the support flanges, and further including at least one projection which is made of metal and cooperates with the holders when the mounting rail is attached to the mounting plate. The second longitudinal end of the rear side is provided with an abutment. The projection and the holders are matched to one another in such a way that when a mounting rail, in particular one according to DIN EN 50 022, is in the mounted position, the projection presses or clamps the first support flange against the contact surfaces of the holders, while the opposite support flange is held in place by the abutment.

These mounting plates have proven to be efficient in practice. However, it turned out that when the mounting rail is oriented vertically, the electrical device, along with the mounting plate, moves out of position on the mounting rail, especially with increasing weight of the electrical devices to be mounted.

SUMMARY

It is an aspect of the present invention to provide a mounting plate, which will allow electrical devices to be mounted on a top-hat shaped mounting rail in such a way that they are reliably prevented from moving out of place.

In an embodiment, the present invention provides a mounting plate including a first fixing device for an electrical device, and a second fixing device for a top-hat shaped mounting rail having a first offset support flange and a second offset support flange. The second fixing device includes a first holder and a second holder each having a contact portion and each being disposed mirror-symmetrically about a longitudinal axis of the mounting plate on a rear surface of the mounting plate. The second fixing device further includes an abutment opposite the first and second holders, and a metal projection configured to clamp at least one of the first and second offset support flanges against the contact portions of the first and second holders. The projection is configured to deform upon a clamping of the at least one of the offset support flanges.

BRIEF DESCRIPTION OF THE DRAWINGS

The mounting plate of the present invention is described below with reference to an exemplary embodiment and the accompanying drawings, in which.

DETAILED DESCRIPTION

Figure 1:
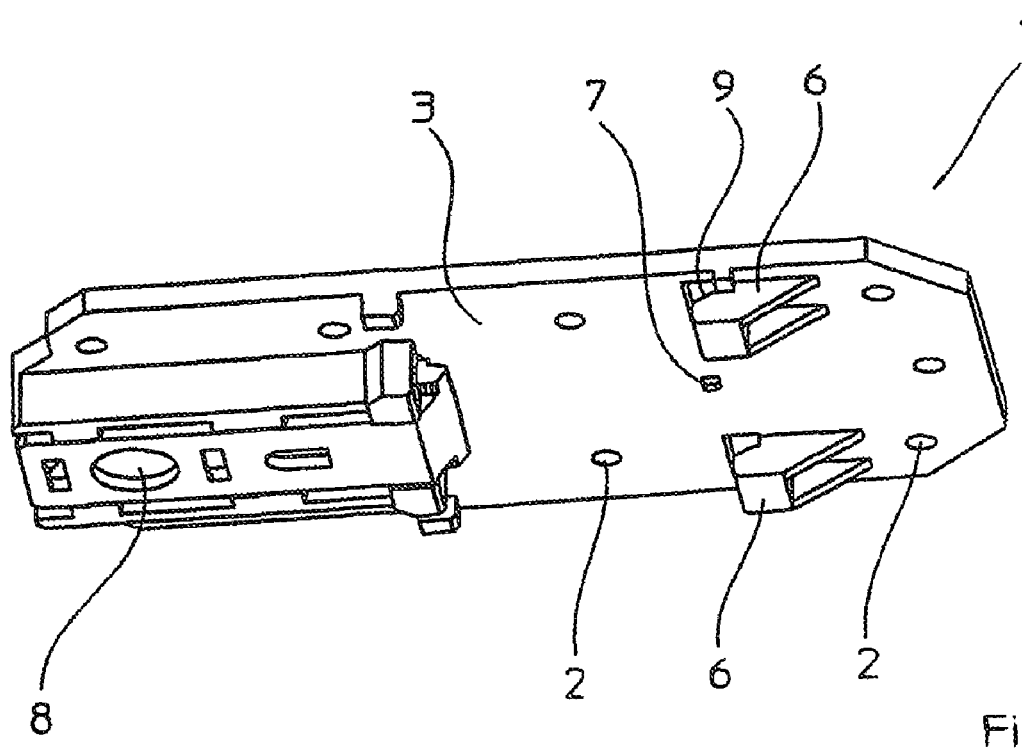
FIG. 1 is a perspective view showing the rear side of the mounting plate in accordance with an embodiment of the present invention including the holders and a projection.

A mounting plate according to an embodiment of the present invention includes fixing means for an electrical device and for a top-hat shaped mounting rail having two offset support flanges, and further includes two holders provided on the rear side of the mounting plate and having a contact portion. In addition, a projection made of metal is provided on the rear side of the mounting plate for clamping at least one of the two offset support flanges against the contact portion of the holder. The projection is selected in terms of arrangement, geometry, dimensions and material properties in such a way that the projection itself and/or a part of the mounting plate that is connected to the projection is deformed as the offset support flange is clamped. Because to this deformation, the contact surface of the projection facing the support flange conforms to the contour thereof, a high contact force acting in a direction toward the support flange even after the deformation. Due to the surface conformation and the continued high contact force, the mounting plate is frictionally secured to the mounting rail without slippage. This allows the electrical device to be reliably held in the desired position within the control cabinet.

In addition, the deformation provides the advantage of preventing the pressure on the mounting plate from exceeding a maximum permissible value, at which the mounting plate would break, especially due to vibrations, oscillating loads, or the like.

Moreover, the material selected for the projection ensures that the contact force remains constant even over an extended period of time, because metal does not deform further or relax over time. This would be the case if the projection were made of a polymeric material.

Moreover, the material selection makes it possible that the deformation of the projection and, thus, its contact pressure against the support flange, remains nearly unaffected by temperature within a temperature range of up to 100° C. Thus, the contact pressure and the slip resistance are independent of the temperature that occurs during normal use of the mounting plate and which typically ranges from −25° C. to 100° C.

Also, this material selection provides the advantage that no deformation will occur even over an extended period of time, for example, several years.

In another advantageous embodiment of the present invention, the mounting plate is made of an electrically conductive material and preferably takes the form of a casting. Due to the material selection, a continuous electrical connection with low contact resistances is provided between the electrical device and the mounting rail when the electrical device is mounted on the mounting plate and the mounting rail is in the mounted position. This eliminates the need for the electrical device to be grounded via a ground strap. In order to minimize manufacturing costs, the mounting plate and the projection are formed as a single piece.

One preferred embodiment of the present invention provides for the projection to be plastically deformed when clamping the offset flange at a portion that has a thickness greater than 2 mm. This makes the mounting plate suitable for attachment of top-hat rails according to DIN EN 50 022-35× 7.5 having a thickness of 1 mm, and for attachment of top-hat rails according to DIN EN 50 022-35×15 having a thickness of from 2.2 mm to 2.5 mm. However, if the projection is designed such that it undergoes significant plastic deformation even when using the 1 mm thick top-hat rails according to DIN EN 50 022-35×7.5, this cold deformation results in increased rigidity and, therefore, it cannot be guaranteed that sufficient plastic deformation will still be achieved when using the thicker top-hat rail according to DIN EN 50 022-35×15. Therefore, this embodiment of the present invention allows the projection to reliably deform plastically, and prevents the contact pressure from exceeding a maximum permissible value. Accordingly, heavy electrical devices can be held without slippage in the control cabinet via the mounting plate and the sturdy top-hat rail according to DIN EN 50 022-35×15, while lighter electrical devices can be attached to the thinner top-hat rail according to EN 50 022-35×7.5 using the same mounting plate.

Thus, this embodiment of the present invention provides a mounting plate which has universal applicability.

In another embodiment of the present invention, the projection includes two portions, the first portion of which is located below the holder, as viewed in the longitudinal side view of the mounting plate, while the adjacent second portion of the projection is located next to the free end of the holder.

In this embodiment, when the mounting rail is in the mounted position, the first portion mainly creates high pressure between the contact portion of the holder and the upper face of the support flange, and between the lower face of the support flange and the contact surface of the first portion. This high pressure leads, in particular, to the deformation of the first portion of the projection. However, if the pressure exceeds a maximum permissible value which can no longer be compensated by deformation of the projection, the mounting plate may break. This is why the first portion of the projection does not extend over the entire length of the holder, as viewed along the length of the mounting plate. The second portion next to the holder and immediately adjacent to the first portion increases the contact surface between the projection and the support flange. This also advantageously makes it possible to control the resistance against displacement of the support flange.

FIG. 1 shows, in a perspective view, a mounting plate 1 which is in the form of an elongated flat member and has fixing means for receiving an electrical or electronic device (not shown). The electrical device can be attached to the front side of mounting plate 1 via the rear side of its housing and the fixing means in the form of holes 2.

The rear side of mounting plate 1, denoted 3, is provided with fixing means for receiving top-hat shaped mounting rails 4 having offset support flanges 5, in particular mounting rails according to DIN EN 50 022. Located near the first end of the rear side are fixing means in the form of two holders 6, which are preferably arranged symmetrically with respect to the longitudinal axis of mounting plate 1. The holders are in the form of hooks having inner contact surfaces and are suitable for engaging over one of the two support flanges 5 of top-hat shaped mounting rail 4. A projection 7 made of metal is provided for the purpose of clamping offset support flange 5 against the contact surfaces of holders 6.

An abutment is provided opposite holders 6, said abutment being in the form of a locking bar 8 capable of sliding in the longitudinal direction of mounting plate 1. The locking bar is moved by spring force in a direction toward holders 6 to the locking position shown in FIG. 1. When inserting a top-hat shaped mounting rail 4 onto mounting plate 1, initially one of the two support flanges 5 is inserted into the receiving structures formed by hook-shaped holders 6 and rear side 3. Insertion is facilitated by an entry bevel 9 provided on the inner side of hooks 6. After that, locking bar 8 is moved from its locking position to its releasing position, and second support flange 5 of top-hat shaped mounting rail 4 is pressed against rear side 3 of mounting plate 1.

The pressure force required to do this is transmitted to the projection protruding above flat rear side 3 and to the inner contact surfaces of holders 6. In order to fix this fastening position, locking bar 8 is moved over support flange 5, returning it to its locking position. In this fastening position, projection 7 acts as a fulcrum, which directs the pressure force toward the inner contact surfaces of holders 6. Thus, projection 7 clamps offset support flange 5 against the contact surfaces of holders 6.

Projection 7 is selected in terms of arrangement, geometry, dimensions and material properties in such a way that it is deformed in this fastening position. As a result of the aforementioned parameters of arrangement, dimensions, and geometry, a pressure force acts on projection 7, support flange 5, and holders 6 when mounting rail 4 is inserted on mounting plate 1. The pressure force and the material properties of the projection, of the support flange and of the holders, in turn, govern the degree of deformation of the projection to a substantial extent.

Figure 2:
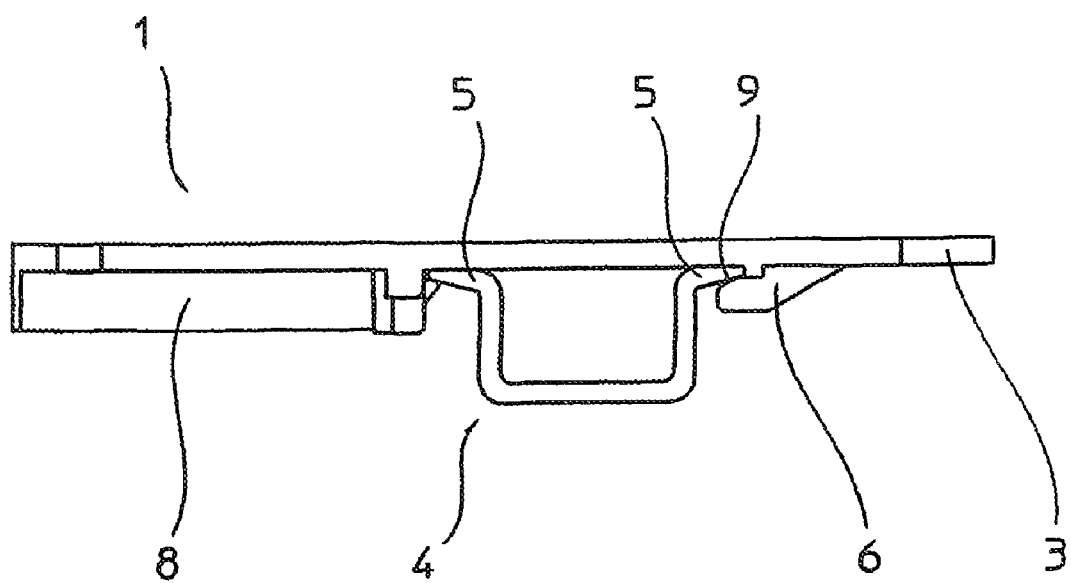
FIG. 2 is a longitudinal side view of the mounting plate of FIG. 1, showing the mounting rail in the mounted position.
Figure 3:
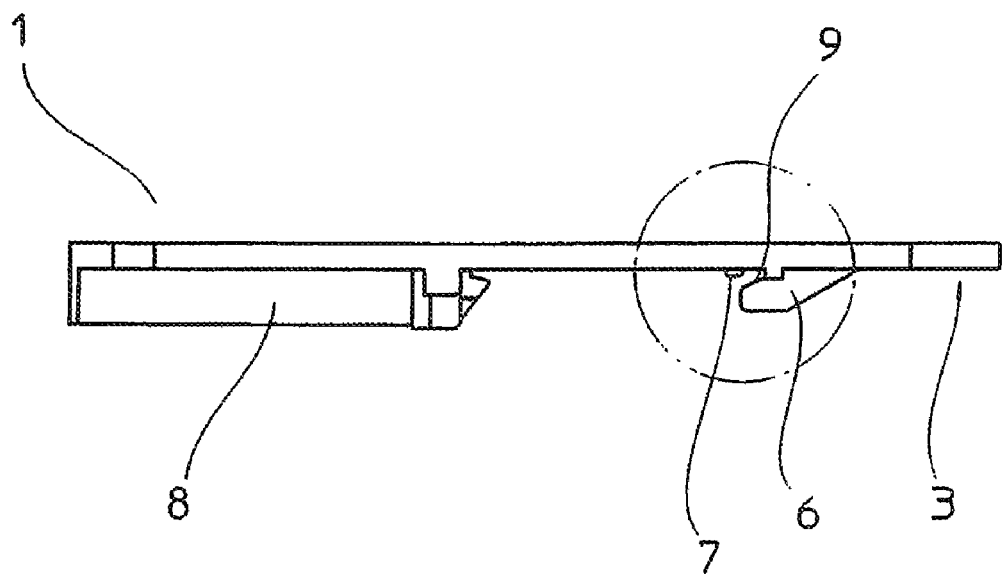
FIG. 3 is a longitudinal side view showing the mounting plate of FIGS. 1 and 2 without the mounting rail.
Figure 3A:
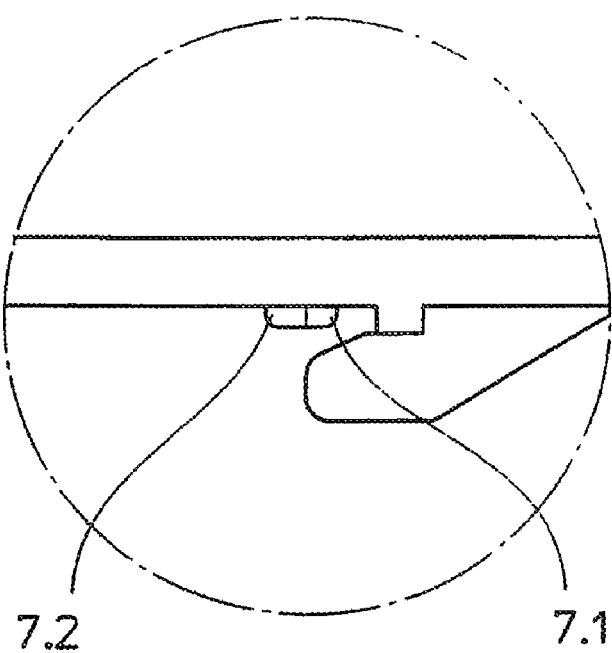
FIG. 3a shows an enlarged portion of the mounting plate of FIGS. 1 and 2 in a longitudinal side view.

With regard to the position of projection 7, it holds that the smaller the distance between holders 6 and projection 7 in the longitudinal direction of mounting plate 1, the larger the pressure force acting on projection 7 and on the contact surfaces of holders 6. Therefore, the deformation of projection 7 is maximum directly below holders 6, as can be seen in FIG. 2. Moreover, the force increases with the height of projection 7 and with the size of its contact surface with the support flange 5 to be clamped. In the present embodiment, the height of projection 7 is greater than 0.6 mm, and the cross-sectional area of this region, i.e., of the contact surface with the support flange, is smaller than 5 mm$^2$, preferably between 2 and 4 mm$^2$.

As shown in FIG. 1, projection 7 is located approximately centrally with respect to the width of mounting rail 1. Thus, when the mounting rail is in the mounted position, a torque is induced about projection 7 and about the longitudinal axis of mounting plate 1, so that support flange 5 is jammed against holders 6 and projection 7, thereby effectively preventing displacement in a direction perpendicular to the mounting plate and in the longitudinal direction of mounting rail 4.

Figure 4:
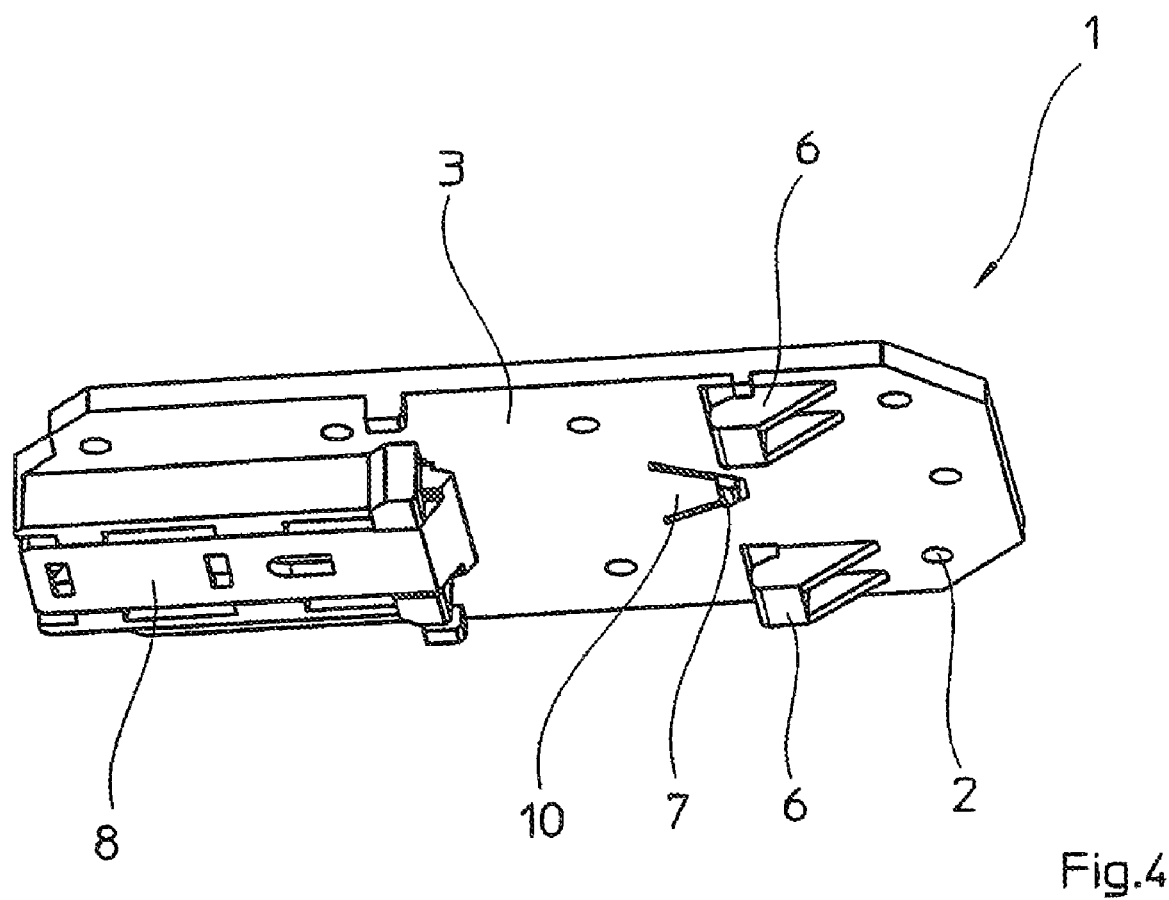
FIG. 4 is a perspective view of a further embodiment of a mounting plate according to the present invention.

Another embodiment of the present invention is shown in FIG. 4. This embodiment differs from the one described above mainly in that a part of mounting plate 1 that is connected to the projection is deformed as offset support flange (5) is clamped. This part is formed by a flat spring 10 formed in the main plane of mounting plate (1). Preferably, the flat spring is formed by V-shaped cuts made in mounting plate (1), and bends in a direction toward the front side of mounting plate 1 when the mounting rail is in the received position. The bending is preferably elastic. Depending on the material properties and configuration of the flat spring, it is possible that both flat spring 10 and projection 7 itself may be deformed when the mounting rail is in the mounted position. This can be achieved, for example, by selecting the length of the V-shaped cuts to be particularly short, and by the material of projection 7 being softer than that of support flange 5.

In addition to the embodiments described above, there are numerous alternatives for implementing the mounting plate according to the present invention. For example, it is possible for the projection to have an undercut. The undercut portion of the projection is not as massive as the remaining portions thereof. Therefore, this is the location where the deformation begins as the mounting rail mounted.

The present invention is not limited to the embodiments describe herein; reference should be had to the appended claims.

What is claimed is:

1. A mounting plate, comprising:
   a first fixing device for an electrical device; and
   a second fixing device for a top-hat shaped mounting rail having a first offset support flange and a second offset support flange, the second fixing device including:
   a first holder and a second holder each having a contact portion and each being disposed mirror-symmetrically about a longitudinal axis of the mounting plate on a rear surface of the mounting plate;
   an abutment opposite the first and second holders, the abutment being slideable relative to the holders along a longitudinal direction of the mounting plate; and
   a metal projection disposed at a distance from the first and second holders with respect to the longitudinal direction and centrally with respect to a width of the mounting plate on the rear surface of the mounting plate and configured to clamp at least one of the first and second offset support flanges against the contact portions of the first and second holders, the projection being configured to deform upon a clamping of the at least one of the offset support flanges.

2. The mounting plate as recited in claim 1, wherein a portion of the mounting plate in a vicinity of the projection is deformed upon the clamping.

3. The mounting plate as recited in claim 1, wherein the projection is plastically deformed upon the clamping.

4. The mounting plate as recited in claim 2, wherein the portion of the mounting plate is plastically deformed upon the clamping.

5. The mounting plate as recited in claim 3, wherein the projection is plastically deformed upon the clamping at a portion of the at least one of the offset support flanges having a thickness greater than 2 millimeters.

6. The mounting plate as recited in claim 4, wherein the portion of the mounting plate is plastically deformed upon the clamping at a portion of the at least one of the offset support flanges having a thickness greater than 2 millimeters.

7. The mounting plate as recited in claim 1, wherein the mounting plate and the projection are formed as a single piece.

8. The mounting plate as recited in claim 1, wherein the projection includes a resilient element.

9. The mounting plate as recited in claim 2, wherein the portion of the mounting plate includes a resilient element.

10. The mounting plate as recited in claim 1, wherein the projection includes an undercut.

11. The mounting plate as recited in claim 2, wherein the portion of the mounting plate includes a flat spring.

12. The mounting plate as recited in claim 1, wherein the mounting plate includes an electrically conductive material.

13. The mounting plate as recited in claim 12, wherein the mounting plate has a form of a casting.

14. The mounting plate as recited in claim 1, wherein at least a portion of the projection includes a height greater than 0.6 millimeters, and the cross section of the portion is less than 5 square millimeters.

15. The mounting plate as recited in claim 1, wherein the mounting plate is an elongated flat member.

16. The mounting plate as recited in claim 1, wherein the projection includes a first portion disposed longitudinally below the first and second holders and a second portion disposed adjacent to a free end of the first and second holders.

* * * * *